US006599188B2

(12) United States Patent
Hirsch et al.

(10) Patent No.: US 6,599,188 B2
(45) **Date of Patent: *Jul. 29, 2003**

(54) PROGRESSIVE BINGO

(75) Inventors: Bertram E. Hirsch, Great Neck, NY (US); John Parker, Jr., Sioux Falls, SD (US)

(73) Assignee: Parker Gaming, Sioux Falls, SD (US)

(*) Notice: Subject to any disclaimer, the term of this patent is extended or adjusted under 35 U.S.C. 154(b) by 44 days.

This patent is subject to a terminal disclaimer.

(21) Appl. No.: 09/681,131

(22) Filed: Jan. 17, 2001

(65) Prior Publication Data

US 2002/0094859 A1 Jul. 18, 2002

(51) Int. Cl.7 ................................................ A63F 13/00

(52) U.S. Cl. ............................ 463/19; 463/16; 463/17; 463/18; 463/40; 463/41; 463/42; 463/25; 463/26; 463/27; 273/269; 273/274; 273/139; 273/138.1

(58) Field of Search ......................... 463/16–19, 40–42, 463/25–27; 273/269, 274, 139, 138.1

(56) References Cited

U.S. PATENT DOCUMENTS

| | | | | | |
|---|---|---|---|---|---|
| 4,373,726 | A | | 2/1983 | Churchill et al. | |
| 4,909,516 | A | | 3/1990 | Kolinsky | |
| 5,007,649 | A | | 4/1991 | Richardson | |
| 5,297,802 | A | | 3/1994 | Pocock et al. | |
| 5,324,035 | A | | 6/1994 | Morris et al. | |
| 5,340,119 | A | | 8/1994 | Goldfarb | |
| 5,679,077 | A | | 10/1997 | Pocock et al. | |
| 5,683,090 | A | | 11/1997 | Zeile et al. | |
| 5,687,971 | A | | 11/1997 | Khaladkar | |
| 5,755,619 | A | | 5/1998 | Matsumoto | |
| 5,830,067 | A | * | 11/1998 | Graves et al. | 463/19 |
| 5,830,069 | A | | 11/1998 | Soltesz et al. | |
| 5,857,911 | A | * | 1/1999 | Fioretti | 463/40 |
| 6,007,426 | A | | 12/1999 | Kelly et al. | |
| 6,099,407 | A | * | 8/2000 | Parker et al. | 463/19 |
| 6,280,325 | B1 | * | 8/2001 | Fisk | 463/19 |

* cited by examiner

*Primary Examiner*—Valencia Martin-Wallace
*Assistant Examiner*—Aaron Capron
(74) *Attorney, Agent, or Firm*—Daniel Rosenberg; Kent Herink; Davis Law Firm

(57) ABSTRACT

A gambling game includes the steps of preparing a plurality of gaming cards with an indicia of identification, and a plurality of gaming symbols on a face of the card. The indicia of identification is recorded within a database of a central computer system. The gaming cards are then distributed to a plurality of remote gaming card dispensing machines networked to the central computer system. Participants can purchase for a predetermined amount of money the gaming cards from the remote gaming card dispensing machines. A first set of symbols is generated and communicated over the network to a plurality of displays. If no winner is determined subsequent symbols are generated, and communicated, until the symbols complete a match on at least one participant's gaming card. The process continues until a participant completes a match and wins.

29 Claims, 3 Drawing Sheets

PROGRESSIVE BINGO

BACKGROUND OF INVENTION

1. Field of the Invention

The invention relates generally to a method and apparatus for playing BINGO. In particular, the method and apparatus relate to playing BINGO in a casino-like environment where a plurality of remotely located users participate in the live BINGO game that includes a progressive jackpot component.

2. Background of the Prior Art

BINGO comprises one of the most widely known and universally played gambling games. Participants play BINGO in a wide variety of social settings from the home, the church, to casinos. Regardless of the specific form and nature of the playing environment, the rules remain largely the same. Each participant purchases, typically for a small predetermined amount of money, a BINGO card. The BINGO card consists of a five by five array of twenty-five spaces. At the top of each column appears one letter from the word BINGO, in order. In other words, at the top of the first column appears the letter "B". At the top of the second column appears the letter "I", and so forth. In each of the twenty-five spaces under the letter headings appears a symbol, or a group of symbols. In particular, in the first column under the letter "B" in each of the spaces appears a letter "B" followed by a number between one and fifteen, in the second column under the letter "I" in each of the spaces appears the letter "I" followed by a number between sixteen and thirty, in the third column under the letter "N" in each of the spaces appears the letter "N" followed by a number between thirty-one and forty-five, in the fourth column under the letter "G" appears the letter "G" followed by a number between forty-six and fifty, and finally in the fifth column under the letter "O" each space contains the letter "O" followed by a number between sixty-one and seventy-five. Within the parameters set forth, the numbers appear randomly in order to maximize the number of unique arrangements for each BINGO card. A common variation for this format includes replacing the symbols in the center most space with a free space. In other words, in row three, column three, a free space replaces the symbols that would normally appear in that space.

The playing of the BINGO game commences with the drawing of a symbol combination. A caller calls out the particular symbol combination selected, or by some other means the symbol combinations are communicated to the participants of the BINGO game. Next, each player searches their BINGO card for the occurrence of the particular symbol combination. If the particular symbol combination appears on a participant's BINGO card, the participant places a marker over that space, or using a dauber, permanently marks that particular space to indicate a match. The symbol selection process continues in the same manner, until a participant obtains a complete match comprising a series of matches in either a horizontal, vertical, or diagonal row. At this point, the participant that establishes such a complete match shouts out "BINGO" and wins the game, along with any associated prize. The minimum number of symbol combinations that can produce a winner comprises four if the vertical, horizontal, or diagonal row includes the free space. In many cases, however, no one wins after the selection of the first four symbol combinations and the selection of symbol combinations continues on until someone establishes the required complete match.

While the game proves fascinating to many, some limitations do exist. First, due to the fact that all of the participants need to be in the same place at the same time, playing of the game typically occurs in small local environments. In order to hear or see the particular selection of each symbol requires physically locating the participants in close proximity. Second, many participants of gaming events find that adding a progressive jackpot component adds excitement to the event. Heretofore, traditional BINGO lacks such a progressive component.

SUMMARY OF INVENTION

An object of the present invention comprises providing a method of playing a gambling game wherein remotely located users participate in a gaming event that includes a progressive jackpot component.

Another object of the present invention comprises providing an apparatus for playing a gambling game wherein remotely located users participate in a gaming event that includes a progressive jackpot component.

These and other objects of the present invention will become apparent to those of ordinary skill in the art upon reference to the following specification, drawings, and claims.

The present invention intends to overcome the difficulties encountered heretofore. To that end, the following describes a method of playing a gambling game amongst a plurality of remote participants. The gambling game includes the steps of preparing a plurality of gaming cards with an indicia of identification, and a plurality of gaming symbols on a face of the card. The indicia of identification is recorded within a data base of a central computer system. The gaming cards are then distributed to a plurality of remote gaming sites, where they are distributed to a plurality of remote gaming card dispensing machines networked to the central computer system. Participants can purchase for a predetermined amount of money, the gaming cards from the remote gaming card dispensing machines. The purchase requests are communicated over the network to the central computer system. A first set of symbols is generated and communicated over the network to a plurality of displays. This allows the participants to determine if they hold a winning card, by completely matching the symbols generated with the symbols on their gaming cards. If no winner is determined subsequent symbols are generated, and communicated, until the symbols form a complete match on at least one participants gaming card.

DETAILED DESCRIPTION

Figure 1:
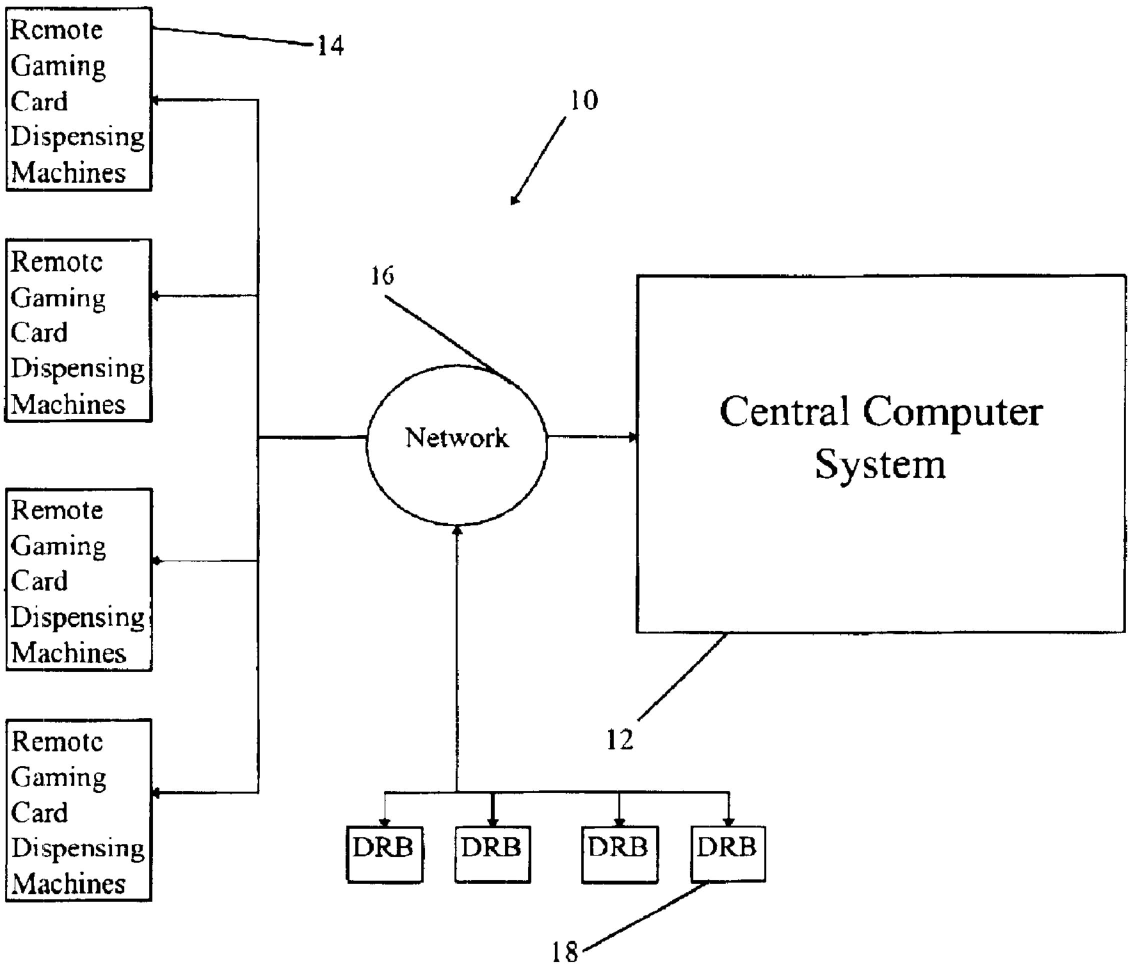
FIG. 1 is a block diagram of an apparatus for playing a gambling game.

In the figures, FIG. 1 shows an apparatus 10 for the playing of the gambling game of the present invention. The apparatus 10 includes a central computer system 12 and a plurality of remote gaming card dispensing machines 14 linked by a network 16. This central computer system 12 also links to a plurality of digital readout boards 18, via the network 16. The central computer system 12 comprises a general purpose computer capable of controlling the functions of the remote gaming card dispensing machines 14 and the digital readout boards 18 over the network 16, under the control of computer program means (not shown). The gaming apparatus 10 facilitates the playing of a live BINGO game at a plurality of remote locations. Each remote location contains at least one digital readout board 18, and typically will include at least one remote gaming card dispensing machine 14. The remote gaming card dispensing machines 14 and the digital readout boards 18, however, are not required to be present at the location where the live BINGO game is played.

Figure 2:
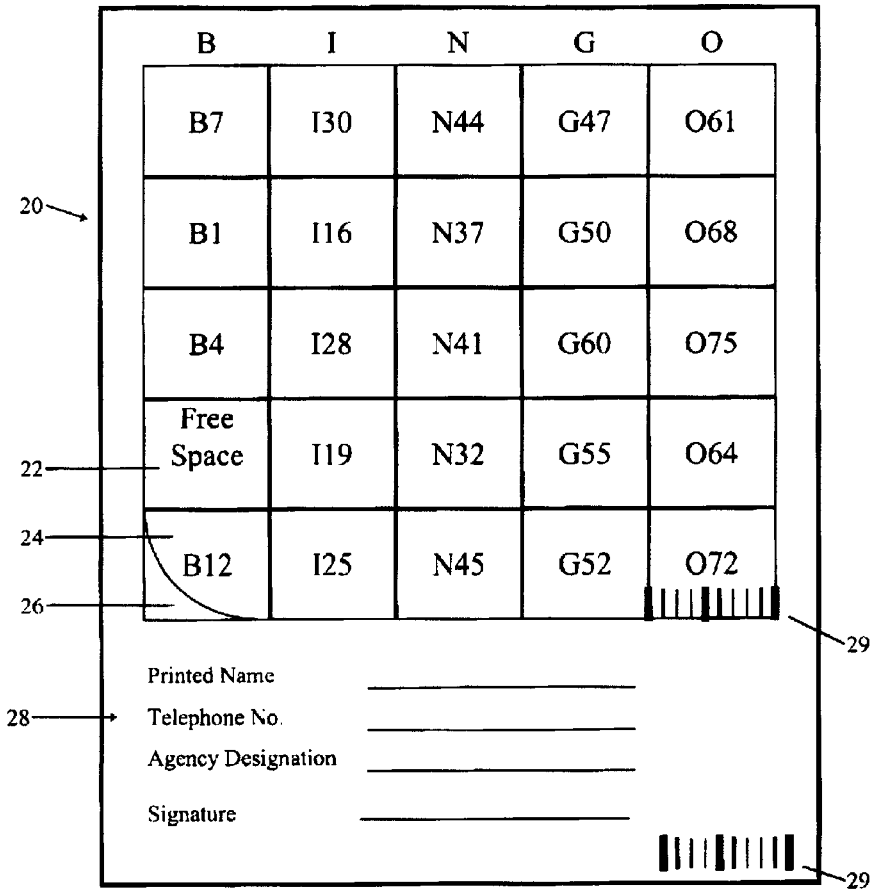
FIG. 2 is a representation of a gaming card.
Figure 3:
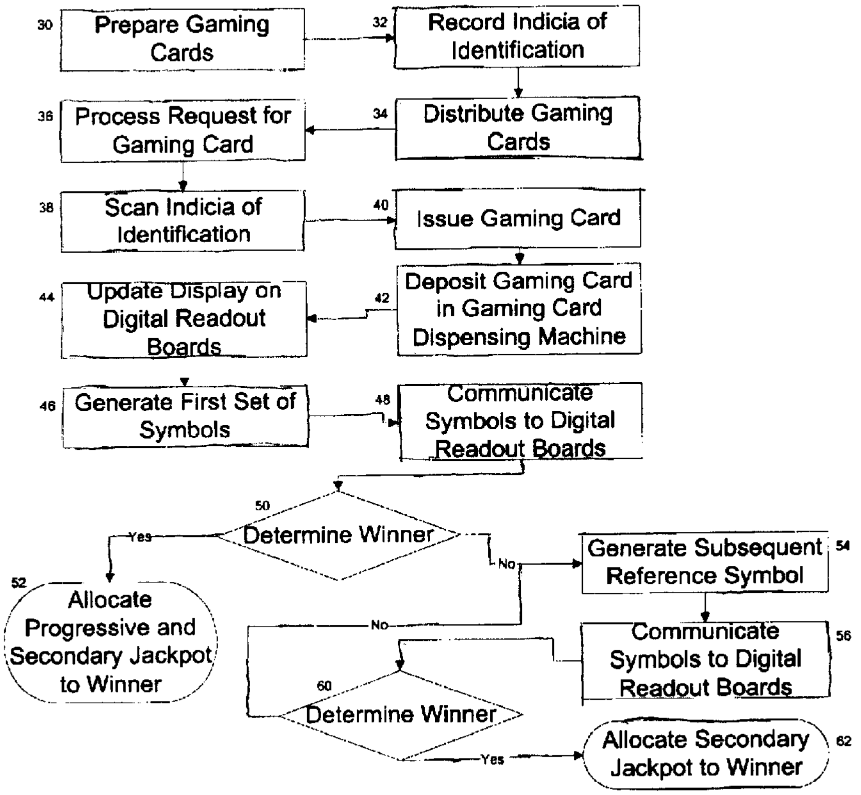
FIG. 3 is a flow chart of a method of playing a gambling game.

Gaming apparatus 10 functions under the control of computer programming means to perform the present invention according to the following methods. FIG. 3 shows in flow chart form the steps of the method of playing the BINGO game of the present invention. The first step in the process comprises Preparing the Gaming Cards 30. The gaming cards 20, shown in FIG. 2 generally resemble traditional BINGO cards with certain modifications. For example, the Gaming Cards 20 of the present invention includes a randomly positioned free space 22. In traditional BINGO, the free space appears in the middle of the center row under the letter "N." According to the method of the present invention, however, the free space 22 can appear in any position. Each gaming card 20 includes a top face 24, which detaches from the gaming card 20. The top face 24 and a bottom face 26 of the gaming card 20 each display a duplicate set of symbols. The gaming card 20 also includes an indicia of identification 28 that serves to identify the individual participant who purchases the gaming card 20. The indicia of identification 28 could include the participants name, signature, address or phone number, and other similar information that would allow for personally identifying, and later locating the participant. Additionally, the indicia of identification 28 preferably includes an agency designation. This allows the participant to designate the gambling site (typically a casino) as the participant's legal agent for purpose of playing the gaming event. Thus, the agency designation actually comprises the legal language required to create the agent/principal relationship. It should be noted that it may be desirable to include in the legal language a recognition, in the form of a wavier, of the potential conflict of interest that may exist if the casino represents multiple participants in the same BINGO game.

Finally, the gaming card 20 includes another indicia of identification 29 that allows for unique identification of each specific gaming card 20. For example, the indicia of identification 29 could comprise a standard bar code identifier. The indicia of identification 29 appears on both the top face 24 and the bottom face 26 of the gaming card 20. This allows for identification and verification of the two faces 24, 26 after separation (described in detail below). The method of the present invention begins with the Prepare Gaming Card step 30, which comprises preparation of a sufficient plurality of gaming cards 20 to supply each of the participants in the game with at least one gaming card 20.

The next step in the method consists of Recording the Indicia of Identification 32. This step consists of recording within a data base of the central computer system 12 each unique indicia of identification 29. This allows for the creation of a data base that can identify, through the indicia of identification 29, each gaming card 20 and the specific arrangement of symbols on its faces 24, 26. Next, is the step of Distributing the Gaming Cards 34. This involves physically moving and allocating the gaming cards 20 to the plurality of the remote gaming card dispensing machines 14. Alternatively, those of ordinary skill in the art will appreciate the fact that the gaming apparatus 10 can electronically transfer virtual gaming cards 20 to the remote gaming card dispensing machines 14. Once loaded into the remote gaming card dispensing machines 14, either physically or electronically, the gaming cards 20 are ready for distribution to participants in the game. Thus, the next step in the method comprises Processing Request for Gaming Cards 36. This involves individual participants purchasing gaming cards 20 by depositing within the remote gaming card dispensing machines 14 a predetermined amount of money.

The next step involves Scanning the Indicia of Identification 38. Prior to issuing the gaming card 20 to the participant, the remote gaming card dispensing machine 14 scans the indicia of identification 29 to uniquely identify with each issuance a specific gaming card 20. Also, the remote gaming card dispensing machines 14 can record the date, location, and time of any such transaction. Additionally, the remote gaming card dispensing machine 14 can actually scan or read the top face 24 of the gaming card 20. In this manner, the machine 14 can associate with each gaming card 20 not only the indicia of identification 29 but also the pattern of symbols on the gaming card 20. This can prove useful later when determining the winner. Those of ordinary skill in the art will understand that the scanning or reading of the top face 24 can take place during the Recording Indicia of Identification step 32.

Next, comprises the step of Issuing the Gaming Card 40. In this step the remote gaming card dispensing machine 14 dispenses an individual gaming card 20 to the participant. If necessary the central computer system 12 can control the issuing of the gaming cards 20 through the network connection 16. In this embodiment of the present invention, for example, the indicia of identification 29 can be communicated to the central computer system 12 prior to issuance. The central computer system 21 can then instruct the remote gaming card dispensing machines 14 whether to approve, or disapprove, issuance of the gaming card 20. For example, if the indicia of identification 29 does not match any of the indicia previously entered into the data base of the central computer system 21, the central computer system 21 would disapprove issuance of the gaming card 20. Of course, those of ordinary skill in the art will realize that the central computer system 12 can approve, or disapprove, issuance of the gaming cards 20 based on information other than the indicia of identification 29.

It should also be understood that the Scanning the Indicia of Identification step 38 and the Recording the Indicia of Identification step 32 could be combined. For example, the indicia of identification 29 could be entered into the central computer system 12 when the remote gaming card dispensing machine 14 issues the gaming card 20. In other words, the remote gaming card dispensing machine 14 would carry the instructions to not only dispense the gaming cards 20, but also the instructions to verify the cards 20 as well. Furthermore, while entering the indicia of identification 29 into the central computer system 12 would prove helpful in quickly identifying a winning gaming card 20 and its location, this step would not be required. As explained in further detail hereinbelow, each gaming site can be in possession of the gaming cards 20 in a manner that will allow it to identify a winning gaming card 20, and the gaming site will also be in the possession of the personal information for it to identify the individual winner.

At this point the individual participant fills out the participant's indicia of identification 28, which includes the participant's name, signature, telephone or address, and an agency designation described in detail below. The individual participant removes the top face 24 from the gaming card 20 and deposits the remainder of the gaming card 20 within the remote gaming card dispensing machine 14, or a suitable secure deposit box located nearby. This preserves the original gaming cards 20 in a safe location until the actual playing of the BINGO game. This comprises the step of Depositing the Gaming Card Receipt In Gaming Card Dispensing Machine 42.

Through the network connection 16, the remote gaming card dispensing machine 14 can transfer to the data base within the central computer system 12, the indicia of identification 29 along with the any other information collected like the time, date, and location of any sale. Also, the participant's indicia of identification 28 can easily be entered into the data base, or associated in some other manner with the indicia of identification 29. In this manner, the data base within a central computer system 12 can maintain a complete record of each specific participant and the individual gaming card 20 purchased by that participant.

Next, comes the step of Updating Display on Digital Readout Boards 44. Once the central computer system 12 receives a record of an individual participant's purchase of a gaming card 20, the central computer system 12 can update each of the remotely located digital readout boards 18 with display information. The display information can include the total jackpot (i.e. the sum of all money paid into the remote gaming card dispensing machines 14 by all of the participants in the game). In this manner, individuals located in each remote gaming site can watch the progress of the gaming event, and participate in the drama and excitement of watching the jackpot build.

In an alternative embodiment, video display monitors (not shown) can replace the digital readout boards 18. The monitors can display the information previously displayed by the digital readout boards 18, plus display the actual playing of the game (described below).

This process repeats over a specified period of time allowing participants at all the remote gaming sites which may be located all over the country or the world, to purchase gaming cards 20 prior to commencement of the actual game. In the preferred embodiment this phase of the game lasts for about one week. At some point prior to commencing the actual playing of the game, the central computer system 12 will instruct the remote gaming card dispensing machines 14 to suspend sales of gaming cards 20. This will allow the central computer system 12 to update all of the digital readout boards 18 so that they will indicate the final jackpot available for the particular playing of the game. The next step in the method commences playing of the BINGO game through Generating the First Set of Symbols 46. Generating the first set of symbols can be accomplished by any number of random selection means. For example, by drawing the BINGO symbol combinations from a drum, a BINGO blower, or by electronically determining the BINGO symbols. Regardless of the manner, the symbol information is entered into the central computer system 12 for communication to the digital readout boards 18 (communicate symbols to Digital Readout Boards 48). Thus, the individual participants of the game can remotely gather within viewing distance of the plurality of the digital readout boards 18, and play the BINGO game in a traditional fashion. For example, participants could mark their removable gaming card top face 24 with a BINGO dauber (or similar device) to indicate any matches. In this manner, regardless of location the individual participants can participate in the BINGO game in the same manner that they would in a traditional locally played BINGO game. The participants only need access to a digital readout board 18. If the participant is not present at the time of the playing of the game, the participant's designated legal agent can mark the gaming card 20 in the manner described above. The playing of the game can take place in a traditional setting with the participants individually holding and daubing their own gaming cards 20, or as explained in greater detail hereinbelow, the gaming site can play the game with the aid of one or more machines that essentially allow for playing many gaming cards 20 simultaneously. Alternatively, the participants could play the BINGO game through a plurality of video display terminals linked to the central computer system 12 and/or the network 16.

Generation of the first set of symbols can take place one at a time, or since no one can win the BINGO game with less than four symbols, the first set of symbols can include four symbol combinations. Upon generation of the first set of symbols, at a minimum four symbol combinations, the central computer system 12 can search the data base to determine if an individual participant holds a winning gaming card 20 (Determine Winner 50). Again, a winning gaming card consists of any gaming card with a combination of generated symbols that produces a complete match as it occurs in traditional BINGO. If the central computer system 12 detects a winning gaming card 20, the central computer system 12 can also identify the individual participant's indicia of identification 28 (if entered into the data base). The central computer system 12 can identify the remote gaming site that issued the winning gaming card 20. The site can then take the necessary steps to identify and locate the winner. This allows for personally identifying the winner, whether the winner is present at the live BINGO game or not. With reference to the flow depicted in FIG. 3, the above describes the steps of Communicating Symbols to Digital Readout Boards 48 and Determining a Winner 50. The winner wins some portion of a jackpot. In actual practice the step of Determining a Winner 50 may take some time, and may even require manual supervision by a supervising gaming official. Thus, it may be advisable to pause the playing of the game until proper verification of the winner can take place, either electronically or by a gaming official manually reviewing or verifying the results. This pause and manual verification will help prevent a player from "sleeping the bingo." In other words, it is important that the game stop when a winner exists even if that winner does not immediately realize that they have won the game. To continue playing the game after one participant has won, risks creating a situation where two or more persons can claim to have won the game. The pause and verification should help eliminate this possibility.

In the preferred embodiment of the present invention the jackpot consists of a progressive jackpot and a secondary jackpot. The jackpots could consist of annuities, with 70% of the total jackpot dedicated to the progressive jackpot, 10% to the secondary jackpot, and the rest going to cover setup and maintenance costs. These totals, of course, can vary without departing from the scope of the intended invention. If the central computer system 12 determines that an individual participant holds a winning gaming card 20, that participant receives one or both of the jackpots. The progressive jackpot is only allocated to a winner who wins upon the generation of the minimum number of symbol combinations, in this case four. Additionally, in this situation, the winner also wins the secondary jackpot. Of course, those of ordinary skill in the art will understand that the progressive jackpot can be allocated in other manners based on other ways of winning the game. This comprises the step of Allocating the Progressive and Secondary Jackpot to Winner 52. If the central computer 12 determines that no participant holds a winning gaming card 20 upon the generation of the first set of symbols, no one wins the progressive jackpot portion and that sum holds over for the playing of the next BINGO game. In this manner, the progressive jackpot can continue to build adding additional excitement over the period of several iterations of playing of the BINGO game.

In an alternative embodiment the secondary jackpot can include a progressive component. For example, if the winner does not claim the secondary jackpot (or the primary jackpot for that matter), the jackpot would roll over to the next playing of the game. In this embodiment the winner would need to claim the jackpot within a specified period of time, for example thirty days.

If the central computer system 12 determines that no individual participant holds the winning gaming card, upon the generation of the first set of symbols (preferably four symbols), flow of the method of the present invention proceeds to Generate Subsequent Reference Symbol step 54. This step consists of generating an individual symbol combination in the same manner described above, and then communicating the symbol to the remotely located digital readout boards 18 (communicate symbols to Digital Readout Boards 56). Next, comprises the Determine Winner step 60 in which the central computer system 12 again scans the database to determine if any individual participant holds a winning gaming card 20. If the central computer system 12 indicates no such winner, the process of generating symbol combinations continues until the central computer system 12 indicates an individual winner. Eventually, the method flows to allocate the secondary jackpot to winner step 62. In this situation the individual winner is allocated the secondary jackpot only, the progressive jackpot holds over to the next playing of the game, and the present game concludes.

According to the method of present invention, the central computer system 12 can determine if a participant wins the game. If the winning participant is present when the game is played, they can collect their share of the jackpot. If the winning participant is not present, by virtue of the agency designation the winning participant can collect the jackpot at a later time from such participant's designated agent. The agency designation, a part of the indicia of identification 28 each participant fills out, allows the participant to designate the purchase site as the participant's designated legal agent for receipt of any jackpot. Thus, the agent site would hold the jackpot, then notify the participant that they won the game and that they can claim their winnings.

While playing BINGO is well understood in the art, the playing of the present game may proceed in a number of fashions. For example, the game could use a standard bingo blower machine to select or generate the BINGO symbols. The machines commonly contain a plurality of BINGO balls in a central chamber that undergo constant mixing through the application of forced air. The machine allows for random selection of the balls. The blower would be centrally located at one of the gaming sites, to facilitate the live playing of the game.

Another useful device contemplated for use with the present invention comprises a bingo card reader machine. The bingo card reader would have the capability to scan the gaming cards 20 to determine if a particular gaming card 20 contained a specific selected symbol. In other words, the machine reads the gaming cards 20 to determine which of the cards 20 contain a match. The bingo card reader would prove particularly useful for the designated agent, in that the agent will likely need to play a large number of gaming cards 20 making the bingo card reader quite helpful. Similarly, in one embodiment of the present invention the agent would play all of the gaming cards 20. For logistical reasons this embodiment of the invention would benefit the gaming site since it would prove most difficult to determine which participants were playing the game live, and which were expecting the agent to play the game. In this embodiment the gaming site can play all of the gaming cards 20 with the bingo card reader. Alternatively, rather than using the bingo card reader to scan the bingo card to recognize the symbols, the bingo card reader could scan a bar code that contains information that would allow the reader to identify the symbol pattern on the gaming card.

Another useful machine contemplated for use with the present invention comprises a daubing machine. The daubing machine would be able to actually mark the gaming cards 20 during the playing of the game. The daubing machine would respond to an input, namely, the selected symbol, and then in conjunction with the card reading machine, the daubing machine would daub or mark those gaming cards 20 containing the selected symbol. Again, the daubing machine would prove particularly useful to the designated agent who may need to play a large number of gaming cards 20 simultaneously.

The bingo card reader and daubing machine(s) (it is possible that the machines could be combined or separate) would work together to facilitate the playing of the game. For example, a gaming official could enter the symbols selected from the bingo blower into the reader/daubing machine(s), which could then scan and mark the gaming cards 20. Or, those of ordinary skill in the art will appreciate the fact that the blower could be replaced with an electronic means for randomly determining the symbols and that information could be electronically communicated to the reader/dauber machine(s).

Another feature of the present invention consist of the ability of the participant not only to designate an agent for playing the game, but also to setup an account with the agent for future playing of the game. The participant could instruct the agent to purchase gaming cards 20, to play the game, or otherwise act on behalf of the participant, and to charge the cost of such activities to the participant's account. This would allow the participant to enjoy the benefits of the game from virtually any location. Thus, there are two methods by which a participant could play the game. First, the participant could purchase a gaming card 20 from a remote gaming card dispensing machine 14. Or, the participant could have the agent purchase the card based on instructions maintained, or provided subsequently, with his or her gaming account.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. Those of ordinary skill in the art will appreciate the fact that the apparatus of the present invention refers to the entire apparatus (or system) for playing the gambling game of the present invention, and not just to the remote gaming card dispensing machine 14.

What is claimed is:

1. A method of playing a gambling game wherein remotely located users participate in a gaming event, said method comprising:

preparing a plurality of gaming cards wherein each of said gaming cards comprises a face with a set of symbols on said face of said gaming card;

distributing said plurality of gaming cards to a plurality of remote gaming card dispensing machines interfaced with a central computer system via a network;

processing a request for one of said plurality of gaming cards upon deposit of payment of a predetermined amount of money into one of said remote gaming card dispensing machines by a remote participant;

issuing said gaming card from said remote gaming card dispensing machine;

generating a first set of reference symbols;

communicating said first set of reference symbols to a display;

daubing said face of said gaming cards in locations that correspond to said first set of reference symbols;

determining if said first set of reference symbols completely matches any of said sets of symbols on said faces of any of said plurality of gaming cards, if said complete match is determined said participant is a winner and said participant is allocated a portion of said money; otherwise generating subsequent reference symbols until said first set of reference symbols and said subsequent reference symbols forms a complete match with one of said set of symbols on said face of at least one of said gaming cards, when said complete match is determined said participant is a winner;

communicating said subsequent reference symbols to said display;

daubing said face of said gaming cards in locations that correspond to said subsequent set of reference symbols; and allocating to said winner a portion of said money.

2. The invention in accordance with claim 1 wherein said gaming card is a bingo card, and said set of symbols on said face of said bingo card are traditional bingo numbers including a free space.

3. The invention in accordance with claim 2 wherein said bingo free space is randomly distributed on said face of said plurality of bingo cards.

4. The invention in accordance with claim 2 wherein said complete match comprises a complete match as it occurs in traditional bingo.

5. The invention in accordance with claim 1 wherein a first portion of said money goes to a progressive jackpot, and where a second portion of said money goes to a secondary jackpot.

6. The invention in accordance with claim 5 wherein if said first set of reference symbols completely matches any of said sets of symbols on said faces of any of said plurality of gaming cards, said winner is allocated said progressive jackpot and said secondary jackpot, and if no such complete match is made said progressive jackpot accumulates toward the next playing of said gambling game.

7. The invention as in accordance with claim 5 wherein if said first set of reference symbols and said subsequent reference symbols forms a complete match with one of said set of symbols on said face of at least one of said gaming cards, said winner is allocated said secondary jackpot.

8. The invention in accordance with claim 1 wherein said first set of reference symbols comprises a set of four symbols.

9. The invention in accordance with claim 1 further comprising the steps of:

receiving a portion of said issued gaming card receipt from said participant, said portion comprising an indicia of identification that allows for personal identification of said participant; and communicating to said database of said central computer system said indicia of identification that allows for personal identification of said participant.

10. The invention in accordance with claim 1 wherein said gaming cards are issued after obtaining approval from said central computer system.

11. The invention in accordance with claim 1 wherein said display comprises a digital readout board.

12. The invention in accordance with claim 1 further comprising the steps of reading with a card reading machine said face of said gaming cards to identify said first set of reference symbols and said subsequent set of reference symbols.

13. The invention in accordance with claim 1 wherein said steps of daubing said gaming cards is performed by a daubing machine.

14. The invention in accordance with claim 1 further comprising the step of recording an indicia of identification within a database of said central computer system, wherein said indicia of identification is located on said gaming card, and said step of determining a match is performed through said central computers system by reference to said indicia of identification.

15. An apparatus for playing a gambling game wherein remotely located users participate in a gaming event, said apparatus comprising:

a plurality of gaming cards wherein each of said gaming cards comprises a face with a set of symbols on said face of said gaming card;

a central computer system;

a plurality of remote gaming card dispensing machines interfaced with said central computer system through a network, said remote gaming card dispensing machines located at a plurality of remote gambling sites;

means for distributing said plurality of gaming cards to said plurality of remote gaming card dispensing machines;

computer program means for processing a request for one of said plurality of gaming cards upon deposit of payment of a predetermined amount of money into one of said remote gaming card dispensing machines by a remote participant;

computer program means for issuing said gaming card from said remote gaming card dispensing machine to said remote participant;

means for generating a first set of reference symbols;

computer program means for communicating said first set of reference symbols to a display;

means for daubing said face of said gaming cards in locations that correspond to said first set of reference symbols;

computer program means for determining said first set of reference symbols completely matches any of said sets of symbols on said faces of any of said plurality of gaming cards, if said complete match is determined said participant is a winner and said participant is allocated a portion of said money; otherwise means for generating subsequent reference symbols until said first set of reference symbols and said subsequent reference symbols forms a complete match with one of said set of symbols on said face of at least one of said gaming cards, when said complete match is determined said participant is a winner;

computer program means for communicating said subsequent reference symbols to said display;

means for daubing said face of said gaming cards in locations that correspond to said subsequent set of reference symbols; and means for allocating to said winner a portion of said money.

16. The invention in accordance with claim 15 wherein said gaming card is a bingo card, and said set of symbols on said face of said bingo card are traditional bingo numbers including a free space.

17. The invention in accordance with claim 16 wherein said bingo free space is randomly distributed on said face of said plurality of bingo cards.

18. The invention in accordance with claim 16 wherein said complete match comprises a complete match at it occurs in traditional bingo.

19. The invention in accordance with claim 15 wherein a first portion of said money goes to a progressive jackpot, and where a second portion of said money goes to a secondary jackpot.

20. The invention in accordance with claim 19 wherein if said first set of reference symbols completely matches any of said sets of symbols on said faces of any of said plurality of gaming cards, said winner is allocated said progressive jackpot and said secondary jackpot, and if no such complete match is made said progressive jackpot accumulates toward the next playing of said gambling game.

21. The invention as in accordance with claim 19 wherein if said first set of reference symbols and said subsequent reference symbols forms a complete match with one of said set of symbols on said face of at least one of said gaming cards, said winner is allocated said secondary jackpot.

22. The invention in accordance with claim 15 wherein said first set of reference symbols comprises a set of four symbols.

23. The invention in accordance with claim 15 further comprising:

means for receiving a portion of said issued gaming card receipt from said participant, said portion comprising an indicia of identification that allows for personal identification of said participant; and computer program means for communicating to said database of said central computer system said indicia of identification that allows for personal identification of said participant.

24. The invention in accordance with claim 15 wherein said gaming cards are issued after obtaining confirmation from said central computing system.

25. The invention in accordance with claim 15 wherein said display comprises a digital readout board.

26. The invention in accordance with claim 15 further comprising program means for recording an indicia of identification within said database of said central computer system, wherein said indicia of identification is located on said gaming card, and said means for determining a match is performed through said central computer system by reference to said indicia of identification.

27. The invention in accordance with claim 1 wherein a first portion of said money goes to a progressive jackpot, and wherein a second portion of said money goes to a secondary jackpot.

28. The invention in accordance with claim 27 wherein if said first set of reference symbols completely matches any of said sets of symbols on said faces of any of said plurality of gaming cards, said winner is allocated said progressive jackpot and said secondary jackpot, and if no such complete match is made said progressive jackpot accumulates toward the next playing of said gambling game.

29. The invention in accordance with claim 27 wherein if said first set of reference symbols and said subsequent reference symbols forms a complete match with one of said set of symbols on said face of at least one of said gamine cards, said winner is allocated said secondary jackpot.

* * * * *